(12) United States Patent
Morenko et al.

(10) Patent No.: US 7,926,286 B2
(45) Date of Patent: Apr. 19, 2011

(54) HEAT SHIELD FOR A FUEL MANIFOLD

(75) Inventors: Oleg Morenko, Oakville (CA); Bhawan B. Patel, Mississauga (CA); Nagaraja Rudrapatna, Mississauga (CA); Saeid Oskooei, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 942 days.

(21) Appl. No.: 11/535,185

(22) Filed: Sep. 26, 2006

(65) Prior Publication Data
US 2008/0072599 A1     Mar. 27, 2008

(51) Int. Cl.
F02C 7/22     (2006.01)
F23R 3/50     (2006.01)

(52) U.S. Cl. .............. 60/772; 60/800; 60/739
(58) Field of Classification Search ............ 60/739, 60/796, 800, 772
See application file for complete search history.

(56) References Cited

U.S. PATENT DOCUMENTS

| | | | |
|---|---|---|---|
| 1,081,950 A | 12/1913 | Eller | |
| 2,151,540 A | 3/1939 | Varga | |
| 2,443,373 A | 6/1948 | Borsoff | |
| 2,946,185 A | 7/1960 | Bayer | |
| 3,213,523 A | 10/1965 | Boehler | |
| 3,472,025 A | 10/1969 | Simmons et al. | |
| 4,100,733 A | 7/1978 | Streibel et al. | |
| 4,322,945 A | 4/1982 | Peterson et al. | |
| 4,327,547 A | 5/1982 | Hughes et al. | |
| 4,332,626 A | 6/1982 | Hood et al. | |
| 4,377,420 A | 3/1983 | Granatek et al. | |
| 4,404,806 A | 9/1983 | Bell, III et al. | |
| 4,467,610 A * | 8/1984 | Pearson et al. | 60/739 |
| 4,472,133 A | 9/1984 | Petersen et al. | |
| 4,483,137 A | 11/1984 | Faulkner | |
| 4,703,888 A | 11/1987 | Kawamura et al. | |
| 4,870,943 A | 10/1989 | Bradley et al. | |
| 5,036,657 A | 8/1991 | Seto et al. | |
| 5,100,291 A * | 3/1992 | Glover | 415/115 |
| 5,231,833 A * | 8/1993 | MacLean et al. | 60/734 |
| 5,253,471 A | 10/1993 | Richardson | |
| 5,271,219 A | 12/1993 | Richardson | |
| 5,396,759 A | 3/1995 | Richardson | |
| 5,396,763 A * | 3/1995 | Mayer et al. | 60/765 |
| 5,400,968 A | 3/1995 | Sood | |
| 5,419,115 A | 5/1995 | Butler et al. | |
| 5,423,178 A | 6/1995 | Mains | |
| 5,570,580 A | 11/1996 | Mains | |
| 5,579,645 A | 12/1996 | Prociw et al. | |
| 5,598,696 A | 2/1997 | Stotts | |
| 5,737,921 A | 4/1998 | Jones et al. | |
| 5,771,696 A | 6/1998 | Hansel et al. | |
| 5,797,266 A | 8/1998 | Brocard et al. | |
| 5,848,525 A | 12/1998 | Spencer | |

(Continued)

FOREIGN PATENT DOCUMENTS

CA     1013153     7/1977

(Continued)

*Primary Examiner* — Ted Kim
(74) *Attorney, Agent, or Firm* — Ogilvy Renault LLP (57) ABSTRACT

A fuel injection system for a gas turbine engine having a manifold ring, a plurality of spray tip assemblies and a heat shield including at least two heat shield segments cooperating to at least substantially surround a cross-section of the manifold ring around a circumference of the manifold ring, and detachably retained around the manifold ring through a plurality of removable fasteners.

19 Claims, 6 Drawing Sheets

U.S. PATENT DOCUMENTS

| | | | |
|---|---|---|---|
| 5,848,874 A * | 12/1998 | Heumann et al. | 415/189 |
| 5,938,402 A | 8/1999 | Bochud et al. | |
| 5,944,483 A | 8/1999 | Beck et al. | |
| 5,956,955 A | 9/1999 | Schmid | |
| 5,983,642 A | 11/1999 | Parker et al. | |
| 5,996,335 A | 12/1999 | Ebel | |
| 6,109,038 A | 8/2000 | Sharifi et al. | |
| 6,141,968 A | 11/2000 | Gates et al. | |
| 6,149,075 A | 11/2000 | Moertle et al. | |
| 6,240,732 B1 | 6/2001 | Allan | |
| 6,256,995 B1 | 7/2001 | Sampath et al. | |
| 6,463,739 B1 | 10/2002 | Mueller et al. | |
| 6,503,334 B2 | 1/2003 | Ruiz et al. | |
| 6,712,080 B1 | 3/2004 | Handschuh et al. | |
| 6,761,035 B1 | 7/2004 | Mueller | |
| 2003/0014979 A1 | 1/2003 | Summerfield et al. | |
| 2005/0188699 A1* | 9/2005 | Shafique et al. | 60/739 |
| 2006/0156731 A1* | 7/2006 | Prociw et al. | 60/739 |

FOREIGN PATENT DOCUMENTS

| | | |
|---|---|---|
| CA | 2307186 | 5/1999 |
| EP | 0660038 | 6/1995 |
| EP | 0939275 | 9/1999 |
| GB | 2404976 | 2/2005 |
| WO | WO 9504244 | 2/1995 |

* cited by examiner

FIG-1

FIG_2

FIG. 3

FIG_4

FIG_5

HEAT SHIELD FOR A FUEL MANIFOLD

TECHNICAL FIELD

The invention relates generally to a gas turbine engine and, more particularly, to the heat shield covering a manifold ring in such an engine.

BACKGROUND OF THE ART

Typically, the heat shield covering a manifold ring in a gas turbine engine is in the form of two complementary portions each surrounding part of a cross-section of the manifold ring, extending around the entire circumference of the manifold ring, and attached thereto through welded or brazed joints. As such, the material of the heat shield must be adapted for welding to the manifold ring, which limits the selection of possible materials that can be used. The welded or brazed joint is also generally highly stressed due to a difference in thermal growth between the heat shield and the manifold ring. The welded or brazed joints further usually act as heat input points transferring heat from the heat shield to the manifold ring, thus causing a temperature increase in the fuel flowing therein. In addition, repairs to the heat shield itself or to other parts of the manifold assembly, for example the fuel spray tip assemblies, is generally impaired by the fact that the heat shield is permanently attached to the manifold ring.

Moreover, a heat shield portion forming a "complete ring", i.e. extending around the entire circumference of the manifold ring, is generally subjected to high hoop stresses and high vibration stresses, which both limit the life of the heat shield.

In addition, the heat shield portions are usually manufactured through a stamping operation of sheet metal material which, because of the heat shield geometry, generally leads to significant waste of the metal material during the manufacturing process.

Accordingly, improvements are desirable.

SUMMARY OF THE INVENTION

It is therefore an object of this invention to provide an improved heat shield for a manifold of a gas turbine engine.

In one aspect, the present invention provides a fuel injection system for a gas turbine engine, the system comprising a manifold ring having at least one circumferential fuel channel defined therein and at least one inlet in fluid communication with the fuel channel, a plurality of spray tip assemblies in fluid communication with the fuel channel, and a heat shield including at least two heat shield segments cooperating to at least substantially surround a cross-section of the manifold ring around a circumference of the manifold ring, the heat shield segments being detachably retained around the manifold ring by a plurality of removable fasteners.

In another aspect, the present invention provides a heat shield for an annular manifold of a gas turbine engine, the heat shield comprising a plurality of heat shield segments cooperating to define a hollow ring having a substantially closed cross-section, the cross-section being defined at any point about a circumference of the ring by at least two different ones of the heat shield segments cooperating with one another, and each of the heat shield segments extending around only a portion of the circumference of the ring.

In a further aspect, the present invention provides a method of attaching a heat shield to a manifold ring, the method comprising placing at least first and second complementary heat shield portions around the manifold ring such that the heat shield portions cooperate to surround at least a major part of a cross-section of the manifold ring about an entire circumference of the manifold ring, and retaining each of the heat shield portions over the manifold ring with at least one removable fastener.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
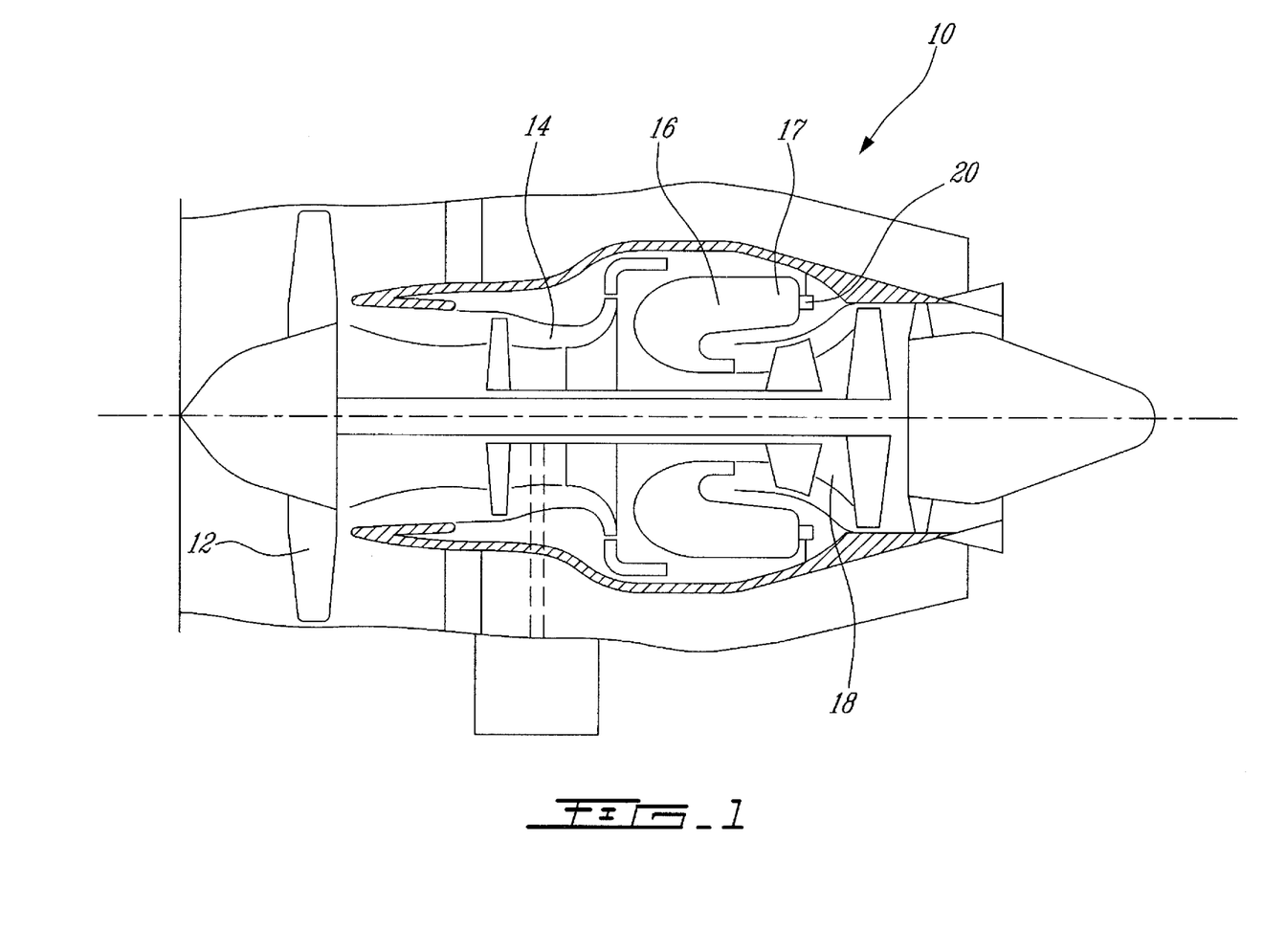
FIG. 1 is a schematic cross-sectional view of a gas turbine engine.

FIG. 1 illustrates a gas turbine engine 10 generally comprising, in serial flow communication, a fan 12 through which ambient air is propelled, a compressor section 14 for pressurizing the air, a combustion section 16 in which the compressed air is mixed with fuel atomized into a combustion chamber 17 by a fuel injection system comprising a fuel injection assembly 20, the mixture being subsequently ignited for generating hot combustion gases before passing through a turbine section 18 for extracting energy from the combustion gases.

Figure 2:
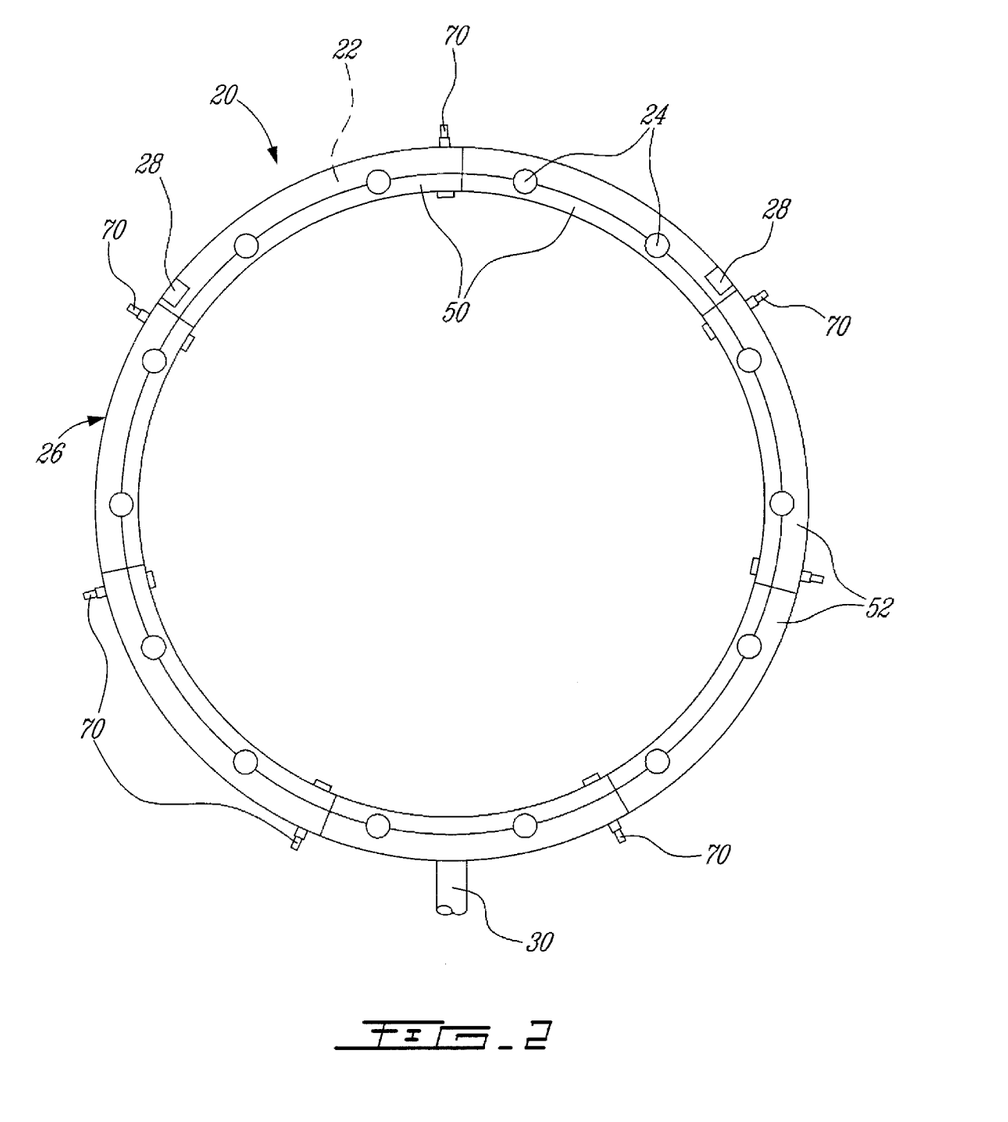
FIG. 2 is a schematic front view of a fuel injection system in accordance with a particular aspect of the present invention, which can be used in a gas turbine engine such as shown in FIG. 1.

Referring to FIG. 2, the fuel injection assembly 20 comprises an annular fuel manifold ring 22 generally disposed adjacent the combustion chamber 17 (see FIG. 1) of the engine 10, and mounted via several integral attachment lugs 28 to an appropriate support structure. The manifold ring 22 comprises a plurality of fuel injector spray tip assemblies 24 thereon, which atomize the fuel for combustion. The spray tip assemblies 24 can be directly mounted to the annular fuel manifold ring 22, i.e. without being interconnected thereto through corresponding nozzle stems. A fuel inlet pipe 30 provides at least one fuel feed to the manifold ring 22, which then distributes the fuel to the spray tip assemblies 24.

Figure 4:
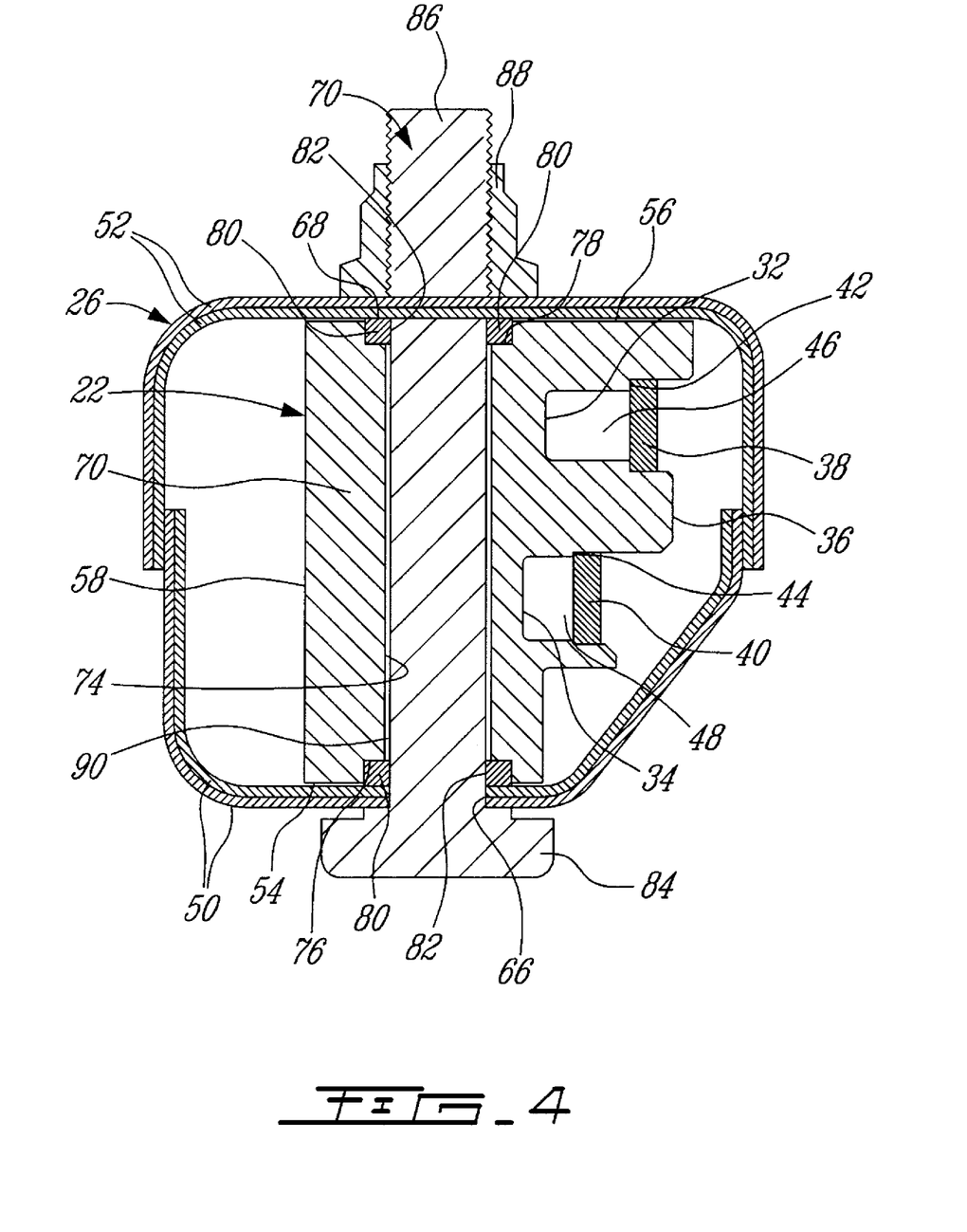
FIG. 4 is a cross-sectional view of the fuel injection system of FIG. 2, taken along lines 4-4 in FIG. 3.
Figure 5:
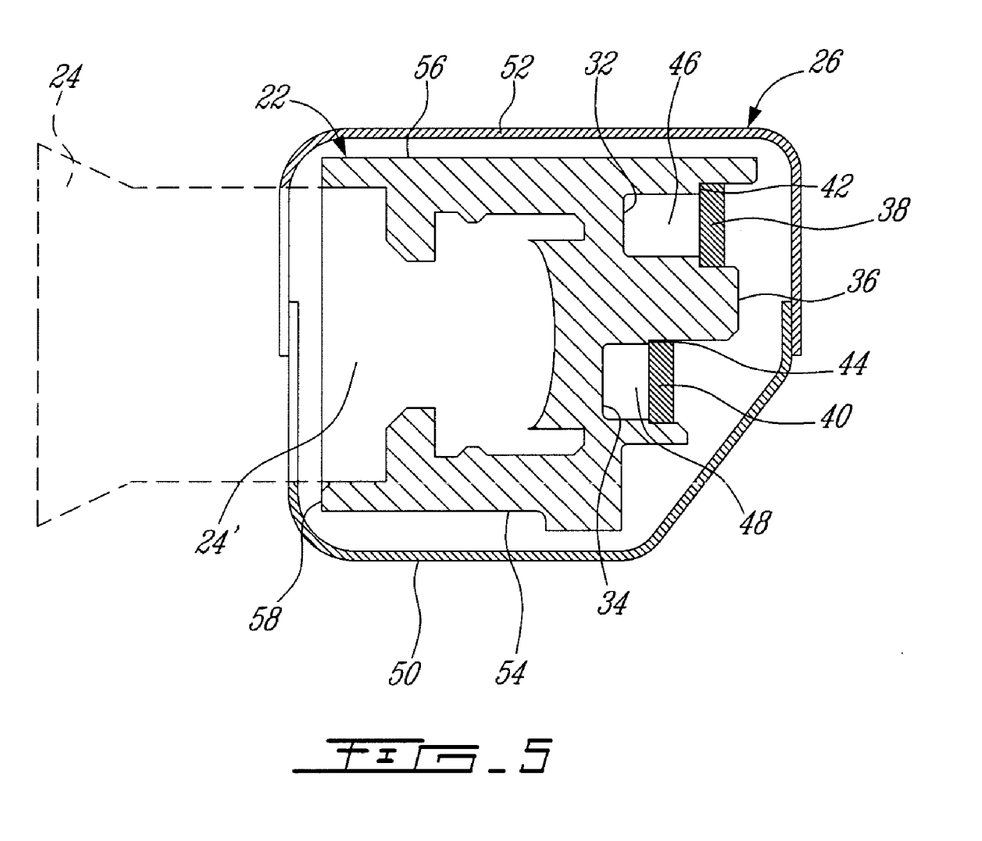
FIG. 5 is a cross-sectional view of the fuel injection system of FIG. 2, taken along lines 5-5 in FIG. 3.

In the embodiment shown, the fuel inlet pipe 30 includes two separate fuel inlets (not shown). Referring to FIGS. 4-5, the manifold ring 22 includes first and second channels 32, 34 defined in a rear surface 36 thereof. Although not shown in the Figures, each channel 32, 34 is in fluid communication with a respective one of the fuel inlets and with each of the spray tip assemblies 24. First and second sealing members 38, 40, for example annular ring plates, are fixed against a shoulder 42, 44 formed within a respective one of the channels 32, 34, by way of brazing or another fastening/sealing method. The sealing members 38, 40 thereby seal their respective channel 32, 34 to form two discrete fuel conduits 46, 48 which can provide independent fuel supplies to the spray tip assemblies 24. The fuel conduits 46, 48 permit circumferential distribution of primary and secondary fuel supplies around the fuel manifold ring 22.

Referring to FIGS. 2, 4 and 5, the fuel injection assembly 20 comprises a heat shield 26 covering the manifold ring 22 and providing thermal protection from the high temperature environment of the combustion chamber 17. The heat shield 26 comprises a plurality of inner segments 50 and a plurality of outer segments 52 cooperating to at least substantially surround a cross-section of the manifold ring 22. As can be seen in FIG. 2, although the heat shield 26 extends around the entire circumference of the manifold ring 22, each heat shield segment 50, 52 covers only a circumferential portion thereof. Referring particularly to FIGS. 4-5, the inner segments 50 thus together cover an inner circumferential surface 54 of the manifold ring 22, and the outer segments 52 together cover an outer circumferential surface 56 of the manifold ring 22.

Referring to FIG. 4, each inner segment 50 cooperates with an outer segment 52 to define a closed cross-section entirely surrounding the cross-section of the manifold ring 22 without contact therewith, in circumferential portions of the manifold ring 22 located between the spray tip assemblies 24. The cooperating inner and outer segments 50, 52 overlap over the rear surface 36 of the manifold ring 22 and over an opposite front surface 58 thereof.

As can be seen in FIG. 5, each inner segment 50 cooperates with an outer segment 52 to define a substantially closed cross-section substantially surrounding the cross-section of the manifold ring 22 without contact therewith, in circumferential portions of the manifold ring 22 receiving one of the spray tip assemblies 24. The cooperating inner and outer segments 50, 52 overlap over the rear surface 36 of the manifold ring 22. The cooperating inner and outer segments 50, 52 also extend over the front surface 58 of the manifold ring 22, leaving a gap therebetween through which the spray tip assembly 24 extends. The inner and outer segments 50, 52 closely surround the spray tip assembly 24, however preferably do not come into contact therewith.

Figure 6A:
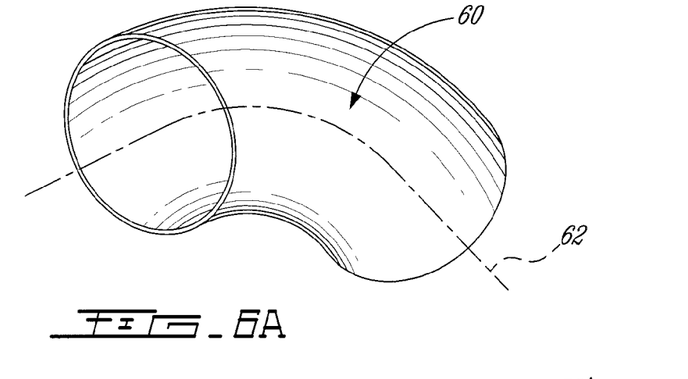
FIGS. 6A-C are partial perspective views of various steps of the manufacture of a heat shield of the fuel injection system of FIG. 2.

In a particular embodiment, the heat shield segments 50, 52 are manufactured by first forming a tubular portion 60 of the heat shield material such that the tubular portion 60 has an arcuate longitudinal axis 62, such as shown in FIG. 6A. This can be done for example through an extrusion process to form a straight tube (not shown) followed by a curving of the tube to obtain the curved tubular portion 60. Alternately, the straight tube can be formed through rolling a sheet of the heat shield material and welding together opposed longitudinal edges thereof, for example through a seam welding process. In a particular embodiment, the heat shield material is an appropriate type of heat resistant stainless steel, such as Grade 347 stainless steel, or an appropriate type of Inconel® (an alloy of nickel, chromium and iron) such as IN718 or IN 625.

Figure 6B:
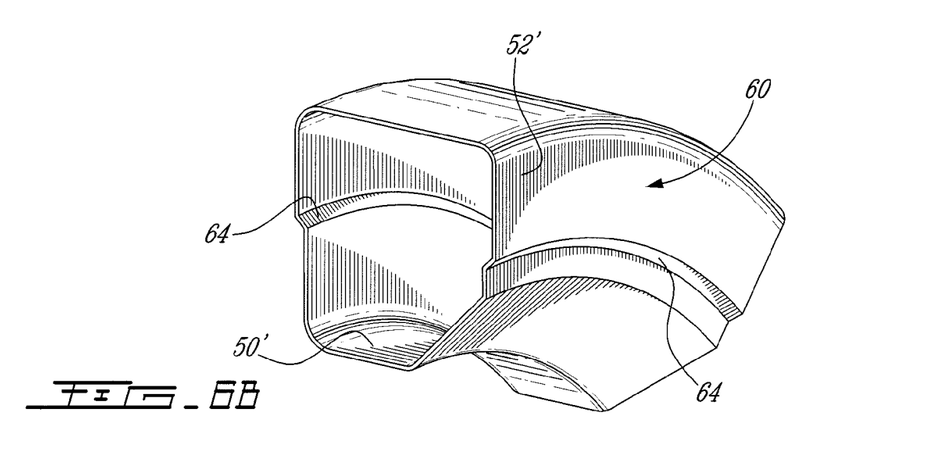

The tubular portion 60 is then deformed, preferably through a hydro forming process, such that its cross-section includes the profile of an inner heat shield segment 50', the profile of an outer heat shield segment 52', and two connection portions 64 interconnecting the inner and outer segment profiles 50', 52', as shown in FIG. 6B. The deformed tubular portion 60 is preferably then heated to perform a stress relief process.

Figure 6C:
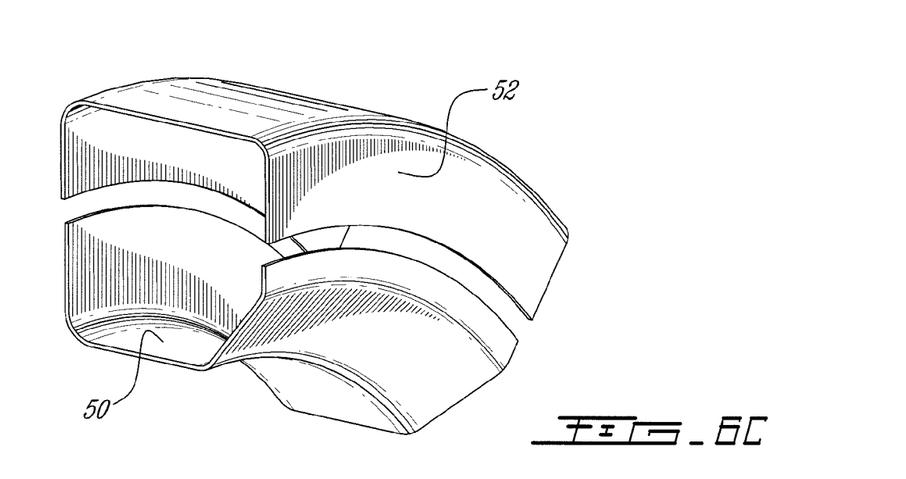

The deformed tubular portion 60 is cut longitudinally, as can be seen in FIG. 6C, in order to detach the inner segment 50, outer segment 52 and connection portions (removed). The tubular portion 60 can have a length corresponding to two or more inner and outer segments 50, 52; in that case, the tubular portion 60 is also cut transversely to detach the inner and outer segments 50, 52. In a particular embodiment, the tubular portion 60 is cut using a laser trimming process.

The inner and outer segments 50, 52 are drilled such as to define holes 66, 68 therein (see FIG. 4), the purpose of which will be explained further below. The inner and outer segments 50, 52 can then be assembled to the manifold ring 22 such as shown in FIG. 4 and described below.

The above described process minimizes the waste material produced during the manufacturing of the heat shield 26, as the only waste material generated by the process generally corresponds to the removed connection portions 64, which are substantially small.

Referring back to FIG. 2, the heat shield segments 50, 52 are detachably connected to the manifold ring 22 through a series of removable fasteners, which in the embodiment shown include a series of radially extending bolts 70. However it is understood that a variety of adequate fasteners can be used in place of the bolts 70 shown.

Referring to FIG. 4, each inner segment 50 is superposed at its end with an adjacent inner segment 50, and each outer segment 52 is superposed at its end with an adjacent outer segment 52. As such, a single bolt 70 connects two adjacent inner segments 50 and the cooperating two adjacent outer segments 52 to the manifold ring 22, thus minimizing the number of bolts 70 required. Alternate configurations may be used, for example having a bolt 70 connecting each pair of cooperating inner and outer segments 50, 52 to the manifold ring 22 independently of the adjacent segments.

Figure 3:
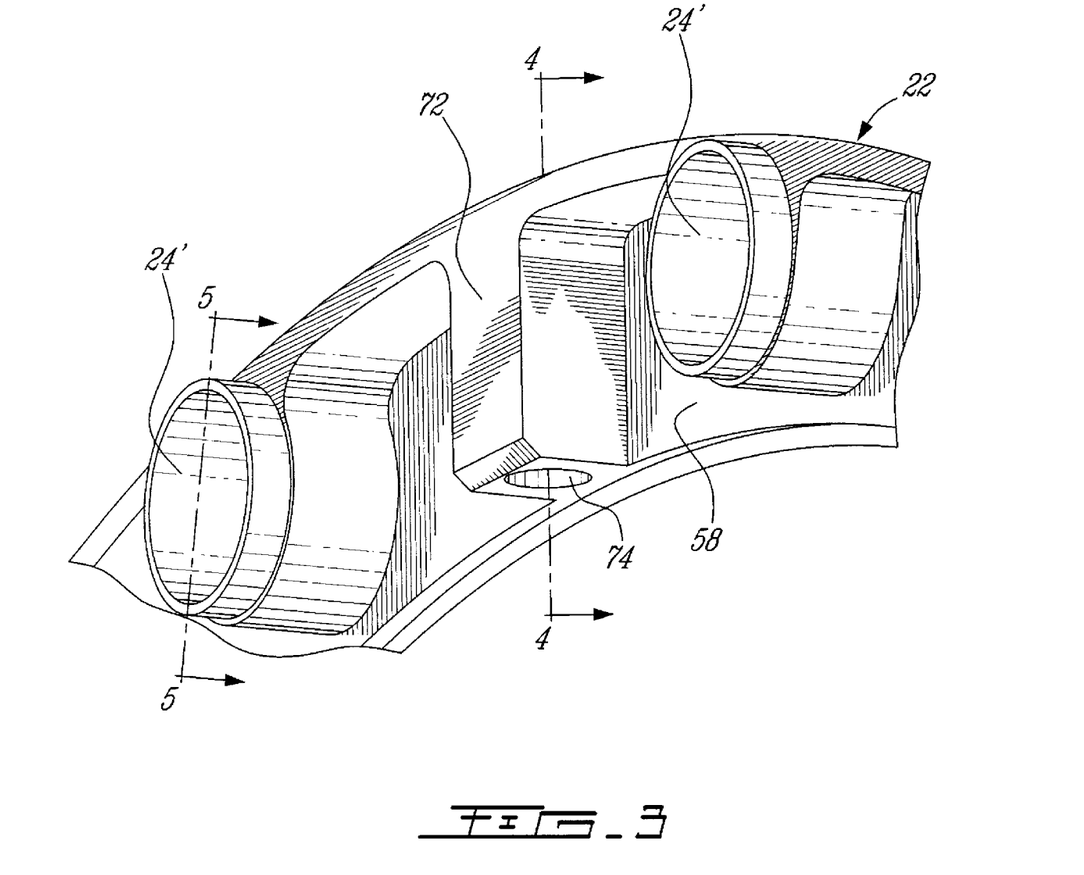
FIG. 3 is a partial perspective view of a manifold ring of the fuel injection system of FIG. 2.

As shown in FIG. 3, the manifold ring 22 includes a plurality of radially extending projections 72 which each extend from the front surface 58 between a pair of adjacent spray tip assembly receiving locations 24'. Each projection 72 has a radially extending bore 74 defined therethrough. As shown in FIG. 4, the projection 72 also includes inner and outer shoulders 76, 78 defined at the opposed ends of the bore 74. An annular spacer 80 is snugly received in each of the shoulders 76, 78, and has a thickness greater than a depth of the respective shoulder 76, 78 such as to protrude from the respective circumferential surface 54, 56 of the manifold ring 22 and abut the corresponding heat shield segment 50, 52. The spacers 80 are made of a suitable heat resistant, insulating material, such as for example INCO 625.

Each hole 66, 68 in the inner and outer heat shield segments 50, 52 is aligned with a corresponding ones of the bores 74. The bolt 70 is inserted through the aligned heat shield segment holes 66, 68, spacer holes 82 and bore 74. The bolt 70 has a head 84 which rests against the inner heat shield segment 50, and an opposed end 86 in threaded engagement with a nut 88 resting against the outer heat shield segment 52. The bolt 70 and nut 88 thus press the inner and outer segments 50, 52 toward each other and against the spacers 80.

The inner diameter of the bore 74 is larger than the outer diameter of the bolt 70, such that the bolt 70 extends therethrough without contacting the manifold ring 22 inside the bore 74. The diameter of the spacer holes 82 is such as to snugly receive the bolt 70 therethrough. As such, the spacers 80 retain the bolt 70 inside the bore 74 out of contact with the manifold ring 22, preventing the bolt 70 from moving and preserving an annular free space 90 around the bolt 70 within the bore 74. The spacers 80 also prevent the inner and outer heat shield segments 50, 52 from contacting the inner and outer circumferential surfaces 54, 56 of the manifold ring 22. As such, the spacers 80 ensure minimal heat transfer from the heat shield 26 and the bolts 70 to the manifold ring 22, preventing the heat shield 26 from contacting the manifold ring 22 around the bolt 70 and preventing the bolt 70 from contacting the manifold ring 22 within the bore 74.

In use, the spray tip assemblies 24 can be attached to the manifold ring 22 before the heat shield 26 is assembled, which allows for testing of the connections between the spray tip assemblies 24 and the manifold ring 22 and for correcting these connections if necessary. The inner and outer heat shield segments 50, 52 are then attached to the manifold ring 22 by the bolts 70, as described above. The assembly of the heat shield 26 is thus significantly simplified when compared to a welding/blazing type assembly.

Accordingly, if access to the manifold ring 22 is required, for example for maintenance purposes, one or more of the heat shield segments 50, 52 can be easily removed by removing the corresponding bolts 70. If part of the heat shield 26 is damaged, the damaged segments 50, 52 can similarly be easily removed and replaced, without the need to replace the entire heat shield 26.

Heat shields connected by a braze or weld usually require a small portion of the manifold ring to be left exposed to the hot environment, such as to provide a location for the heat shield segments to be welded to. In addition, such heat shields usually leave a significant annular gap around each spray tip assembly, such as to be able to attach the spray tip assembly to the manifold ring and/or repair the connection between the spray tip assembly and the manifold ring through the permanently attached heat shield. In the described fuel injection assembly 20, the bolts 70 received in the bores 74 defined through the manifold ring 22 and interconnecting the heat shield segments 50, 52 eliminate the need for a portion of the manifold ring 22 to be left exposed to the hot environment. In addition, since the heat shield segments 50, 52 can be easily removed to access the connection between the spray tip assemblies 24 and the manifold ring 22 if required, the large annular gap in the heat shield 26 around the spray tip assemblies 24 can be eliminated, allowing the heat shield segments 50, 52 to extend close to the spray tip assemblies 24, however preferably do not come into contact therewith. As such, the heat shield 26 covers a greater portion of the manifold ring 22 and better protects the manifold ring 22 against the surrounding hot environment, which in turn allows for a longer life of the manifold ring 22 and/or a higher fuel inlet temperature.

The air in the annular free space 90 around each bolt 70 and the spacers 80 located between the heat shield 26 and the manifold ring 22 minimize the heat transfer from the heat shield 26 and the bolts 70 to the manifold ring 22, and as such to the fuel circulated therein.

The removable fasteners 70 also eliminate the welding compatibility requirement between the heat shield 26 and the manifold ring 22, thus allowing for a wider selection of materials for manufacturing the heat shield 26.

The removable fasteners 70 also minimize the stress due to the difference in thermal growth between the heat shield 26 and the manifold ring 22.

The removable fasteners 70 further allow for a simple assembly process, with a reduced risk of damaging the heat shield segments 50, 52 upon assembly (when compared to a welding/brazing process), which reduces the assembly costs and time.

The heat shield segments 50, 52 each covering only a portion of the circumference of the manifold ring 22 eliminates the hoop stress present in a "complete ring" configuration, which increases the life of the heat shield 26.

The heat shield segments 50, 52 cooperating to cover the entire circumference of the manifold ring 22 have a damping effect on the vibrations of the heat shield 26 produced by the operation of the engine 10, due to friction between the adjacent heat shield segments 50, 52. In addition, in a particular embodiment, the inner segments 50 have different lengths from one another, and the outer segments 52 have different lengths from one another, such that the heat shield segments 50, 52 have different natural frequencies to help prevent the heat shield 26 from being in resonance during normal vibration ranges of the engine 10. As such, the heat shield segments 50, 52 each covering only a portion of the circumference of the manifold ring 22 limit the vibration stress in the heat shield 26 when compared to a "complete ring" configuration.

In an alternative embodiment which is not shown, the heat shield has multiple circumferential segments similar to the inner and outer segments 50, 52 shown, but the heat shield segments are attached to the manifold ring 22 in a permanent fashion, for example through welding or brazing. The heat shield segments can also have a configuration other than the inner and outer segments 50, 52 shown, and can be for example complementary segments joining over the inner and outer circumferential surfaces 54, 56 of the manifold ring 22. These segmented, welded configurations allow for a reduction of the hoop and vibration stresses as described above, and the use of the manufacturing process described above to produce the heat shield segments with a reduced amount of waste material.

In another alternative embodiment which is not shown, the heat shield includes heat shield segments having a "complete ring" configuration, i.e. covering the entire circumference of the manifold ring 22, which are attached to the manifold ring 22 through removable fasteners such as the bolts 70 shown. The configuration of the heat shield segments is such as to allow assembly of the segments around the manifold ring 22. For example, the heat shield can include front and rear heat shield segments which are "complete ring" segments joining along the inner and outer circumferential surfaces 54, 56 of the manifold ring 22, and which are attached to the manifold ring 22 by bolts extending axially therethrough. This "complete ring" configuration attached by removable fasteners allows for the easy removal of at least the rear heat shield for maintenance or repair, the minimization of the portions of the manifold ring 22 exposed to the hot environment, the minimization of the heat transfer to the manifold ring 22 from the shield and fasteners, the wider choice of material for the heat shield through the elimination of welding compatibility requirements, the minimization of the thermal growth mismatch stress, and the reduced assembly costs and time, as described above.

The above description is meant to be exemplary only, and one skilled in the art will recognize that changes may be made to the embodiments described without department from the scope of the invention disclosed. For example, three or more heat shield segments can cooperate to at least substantially surround the cross-section of the manifold ring 22, whether the heat shield segments extend around the entire circumference of the manifold ring 22 or only a portion thereof. The heat shield segments extending around only a portion of the circumference of the manifold ring 22 can include front and rear heat shield segments overlapping and/or joining over the inner and outer circumferential surfaces 54, 56 of the manifold ring 22. Other modifications which fall within the scope of the present invention will be apparent to those skilled in the art, in light of a review of this disclosure, and such modifications are intended to fall within the appended claims.

What is claimed is:

1. A fuel injection system for a gas turbine engine, the system comprising:
   a manifold ring having at least one circumferential fuel channel defined therein and at least one inlet in fluid communication with the fuel channel;

a plurality of spray tip assemblies in fluid communication with the fuel channel;

a heat shield including at least two arcuate heat shield segments cooperating to at least substantially surround a cross-section of the manifold ring around a circumference of the manifold ring, each heat shield segment defining only a portion of the cross-section and a portion of the circumference; and a plurality of individual fasteners extending through the manifold ring which are detachably connected to the heat shield segments and detachably retaining the heat shield segments around the manifold ring, the fasteners coupling cooperating arcuate heat shield segments to each other about the cross section of the manifold ring.

2. The system as defined in claim 1, wherein the fasteners join cooperating heat shield segments without contacting the manifold ring.

3. The system as defined in claim 1, wherein the manifold ring includes a series of bores defined therethrough, each of the bores receiving a respective one of the fasteners therein.

4. The system as defined in claim 3, wherein each bore has a diameter larger than a diameter of the respective fastener received therein, and the manifold ring includes spacers cooperating with each bore to prevent the fastener from contacting the manifold ring inside the bore.

5. The system as defined in claim 4, wherein the manifold ring has a shoulder defined therein around each end of each bore, and a respective one of the spacers is snugly received in each shoulder and tightly surrounds the respective fastener.

6. The system as defined in claim 4, wherein the spacers also prevent the heat shield segments from contacting the manifold ring.

7. The system as defined in claim 1, wherein the heat shield closely surrounds each of the spray tip assembly such as to be at least almost in contact therewith.

8. The system as defined in claim 1, wherein the heat shield segments cooperate to completely surround the cross-section of some circumferential portions of the manifold ring.

9. The system as defined in claim 1, wherein the heat shield segments includes at least first and second series of heat shield segments, each of the heat shield segments extending around a portion of the circumference of the manifold ring, and corresponding segments from each of the series cooperating to at least substantially surround the cross-section of the manifold ring.

10. The system as defined in claim 9, wherein the first series includes inner heat shield segments cooperating to cover a circumferential portion of an inner circumferential surface of the manifold ring, and the second series includes outer heat shield segments cooperating to cover a circumferential portion of an outer circumferential surface of the manifold ring.

11. The system as defined in claim 10, wherein the manifold ring includes a series of radially extending bores defined therethrough, each of the bores receiving a respective one of the fasteners therein, each fastener interconnecting at least one of the inner segments and at least one of the outer segments.

12. A heat shield for an annular fuel manifold of a gas turbine engine, the heat shield comprising a plurality of heat shield segments cooperating to define a hollow ring having a substantially closed cross-section, the cross-section being defined around an entire circumference of the annular fuel manifold by at least two different ones of the heat shield segments cooperating with one another, with each of said shield segments defining only a portion of the cross-section and a portion of the circumference, and each of the heat shield segments extending around only a portion of the circumference of the ring; a plurality of individual fasteners extending through the annular fuel manifold, the fasteners coupling cooperating arcuate heat shield segments to each other about the cross section of the annular fuel manifold.

13. The heat shield as defined in claim 12, wherein the heat shield segments overlap at selected points of the circumference of the ring such that the cross-section at the selected points is closed.

14. The heat shield as defined in claim 12, wherein the plurality of heat shield segments include inner segments and outer segments, each of the inner segment cooperating with a corresponding one of the outer segments to define the cross-section, the inner segments cooperating to define an inner circumferential surface of the ring, and the outer segments cooperating to define an outer circumferential surface of the ring.

15. The heat shield as defined in claim 12, wherein the heat shield segments are made of one of stainless steel and an alloy of nickel, chromium and iron.

16. A method of attaching a heat shield to a gas turbine fuel manifold ring, the method comprising:

placing at least first and second complementary arcuate heat shield portions around the gas turbine fuel manifold ring such that the heat shield portions cooperate to at least substantially surround a cross-section of the manifold ring about an entire circumference of the manifold ring; each of said shield portions defining only a portion of the cross-section and a portion of the circumference;

providing a plurality of individual fasteners extending through the manifold ring and coupling the complementary heat shield portions to each other about the cross section of the manifold ring; and retaining each of the heat shield portions over the manifold ring with at least one of the fasteners.

17. The method as defined in claim 16, wherein placing the at least first and second heat shield portions includes placing the first and second heat shield portions around the manifold ring such that the first and second heat shield portions cooperate to surround the major part of the cross-section about a portion of the circumference, and placing at least third and fourth heat shield portions around the manifold ring such that the at least third and fourth heat shield portions cooperate to cover the at least major part of the cross-section about a remainder of the circumference.

18. The method as defined in claim 16, wherein retaining each of the heat shield portions includes passing the removable fastener through a bore defined in the manifold ring and interconnecting at least two of the heat shield portions covering different surfaces of the manifold ring with the fastener.

19. The method as defined in claim 18, further including preventing the fastener from contacting the manifold ring inside the bore.

* * * * *